United States Patent
Blumenthal et al.

[11] Patent Number: 5,847,314
[45] Date of Patent: Dec. 8, 1998

[54] APPARATUS FOR INFLATING A VEHICLE OCCUPANT PROTECTION DEVICE

[75] Inventors: Jack L. Blumenthal, Los Angeles; Lee D. Bergerson, Fountain Valley; Ivan L. Stonich, Hermosa Beach, all of Calif.

[73] Assignee: TRW Vehicle Safety Systems Inc., Lyndhurst, Ohio

[21] Appl. No.: 784,255

[22] Filed: Jan. 15, 1997

[51] Int. Cl.⁶ .......................... C06B 47/00; B60R 21/26
[52] U.S. Cl. ................................. 149/1; 280/737
[58] Field of Search ..................... 179/1; 280/737

[56] References Cited

U.S. PATENT DOCUMENTS

| | | | |
|---|---|---|---|
| 1,551,650 | 9/1925 | Egloff | 149/1 |
| 3,779,009 | 12/1973 | Friedman | 149/1 |
| 5,344,186 | 9/1994 | Bergerson et al. | |
| 5,348,344 | 9/1994 | Blumenthal et al. | |
| 5,350,192 | 9/1994 | Blumenthal | |
| 5,441,302 | 8/1995 | Johnson et al. | 280/737 |
| 5,460,406 | 10/1995 | Faigle | 280/737 |
| 5,470,104 | 11/1995 | Smith et al. | |
| 5,494,312 | 2/1996 | Rink | |
| 5,577,769 | 11/1996 | DiGiacomo et al. | 280/737 |
| 5,580,086 | 12/1996 | McAlister | 280/737 |
| 5,609,361 | 3/1997 | Ferguson et al. | 280/737 |

*Primary Examiner*—Peter A. Nelson
*Attorney, Agent, or Firm*—Tarolli, Sundheim, Covell, Tummino & Szabo

[57] ABSTRACT

A vehicle safety apparatus (10) for use in inflating an inflatable vehicle occupant protection device (12) comprises a pressure vessel (14) for containing a combustible mixture of gases. A combustible mixture (18) of gases is contained within the pressure vessel. The combustible mixture (18) of gases comprises a combustible fuel gas mixture, an oxidizer gas for supporting combustion of the fuel gas mixture, and an inert gas. The fuel gas mixture comprises hydrogen gas and a hydrocarbon gas. The hydrogen gas comprises about 84 to about 96 molar percent of the fuel gas mixture. The hydrocarbon gas comprises about 4 to about 16 molar percent of the fuel gas mixture. An actuatable igniter (12) is provided for igniting the combustible mixture (18) of gases in the pressure vessel (14). Gas is enabled to flow from the pressure vessel (14) into the vehicle occupant protection device (12).

19 Claims, 1 Drawing Sheet

APPARATUS FOR INFLATING A VEHICLE OCCUPANT PROTECTION DEVICE

FIELD OF THE INVENTION

The present invention relates to a new and improved apparatus for inflating an inflatable vehicle occupant protection device, such as an air bag, and particularly relates to a combustible gaseous mixture in an air bag inflator.

BACKGROUND OF THE INVENTION

A known apparatus for inflating an inflatable vehicle occupant protection device, such as an air bag, includes a pressure vessel containing a combustible mixture of gases including a combustible fuel gas. Hydrogen gas is typically the combustible fuel gas in the combustible mixture of gases. An initiator is disposed in the pressure vessel. The initiator is actuatable, upon the occurrence of a condition indicative of a vehicle collision for which air bag inflation is desired, to ignite the combustible fuel gas in the combustible mixture of gases. As the fuel gas burns, it heats the remaining gas in the pressure vessel and thereby increases the pressure of the gas in the pressure vessel. The pressurized gas is directed into the air bag to inflate the air bag. It is desirable to provide a combustible mixture of gases which produces a relatively high output pressure in the air bag while maintaining a relatively low peak pressure in the pressure vessel.

SUMMARY OF THE INVENTION

The present invention relates to an apparatus for use in inflating an inflatable vehicle occupant protection device. The apparatus comprises a pressure vessel for containing a combustible mixture of gases. A combustible mixture of gases is contained within the pressure vessel. The combustible mixture of gases comprises a combustible fuel gas mixture, an oxidizer gas for supporting combustion of the fuel gas mixture, and an inert gas. The fuel gas mixture comprises hydrogen gas and a hydrocarbon gas. The hydrogen gas comprises about 84 to about 96 molar percent of the fuel gas mixture and the hydrocarbon gas comprises about 4 to about 16 molar percent of the fuel gas mixture. An actuatable igniter is provided for igniting the combustible mixture of gases in the pressure vessel. The apparatus includes means for enabling gas to flow from the pressure vessel into the vehicle occupant protection device.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF EMBODIMENTS OF THE INVENTION

Figure 1:
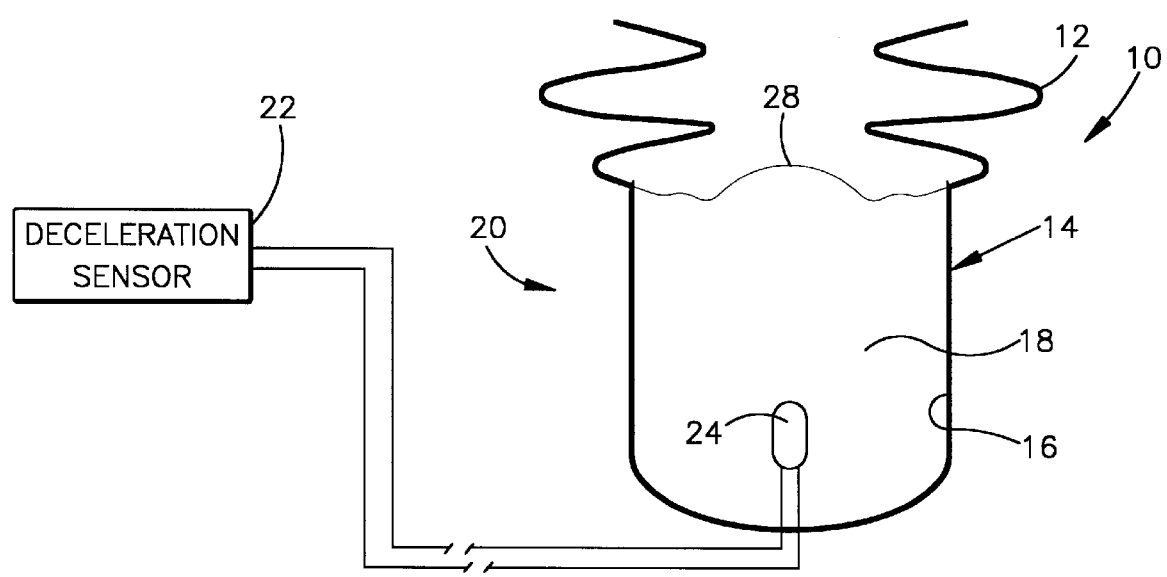
FIG. 1 is a schematic illustration of an apparatus in accordance with the present invention.

The present invention is applicable to various inflators and may be embodied in a number of different structures. As representative of the present invention, FIG. 1 illustrates a vehicle occupant safety apparatus 10. The vehicle occupant safety apparatus 10 includes an inflatable vehicle occupant protection device in the form of an air bag 12. The apparatus 10 also includes an inflator 20 for inflating the air bag 12.

The inflator 20 includes a pressure vessel or container 14. The container 14 defines a chamber 16 which holds a combustible mixture 18 of gases. The combustible mixture 18 of gases, described below in detail, includes a combustible fuel gas, an oxidizer gas for supporting combustion of the fuel gas, and an inert gas.

The combustible mixture 18 of gases is stored under pressure in the chamber 16. The pressure depends upon such factors as the volume of the air bag 12 to be inflated, the time available for inflation, the inflation pressure desired, the volume of the container 14, and the molar percentage of each of the gases in the combustible mixture 18 of gases. Normally, the combustible mixture 18 of gases is stored in the chamber 16 at a pressure of about 500 to about 5,000 pounds per square inch (psi). Preferably, the combustible mixture 18 of gases is stored in the chamber 16 at a pressure of about 2,000 to about 4,000 psi.

Upon the occurrence of sudden vehicle deceleration indicative of a collision for which inflation of the air bag 12 is desired, a deceleration sensor 22, of any known and suitable construction, activates an igniter 24 in the chamber 16 to ignite the fuel gas in the combustible mixture 18 of gases. The combustion of the fuel gas is supported by the oxidizer gas.

Combustion of the fuel gas results in combustion products, including heat. The pressure in the chamber 16 rises due to warming of at least the inert gas by the heat created by the combustion of the fuel gas. Other gases or vapors may also result from the combustion of the fuel gas. The heated inert gas, any excess fuel and/or oxidizer gas, and any such other gases or vapors, together form an inflation fluid for inflating the air bag 12.

After a predetermined time, or when a predetermined pressure is reached in the chamber 16, the pressure of the inflation fluid in the chamber causes a wall 28 of the chamber 16 to burst or open, enabling the inflation fluid to flow into the air bag 12. The inflation fluid is directed into the air bag 12 by the opened wall 28. The air bag 12 inflates into a predetermined position for helping to protect a vehicle occupant. The wall 28 of the container 14 may also be opened on command, or by the igniter 24.

Because the fuel gas in the combustible mixture 18 of gases combusts to generate heat which increases the pressure of the gases in the chamber 16, the total volume of gas which must be stored in the container 14 to inflate the air bag 12 to a desired pressure is minimized. Additionally, since combustion of the fuel gas results in gaseous material, e.g., water vapor, instead of solid particulates, there is no need for a particulate filter or the like in the inflator 20.

As discussed above, the combustible mixture 18 of gases includes a combustible fuel gas, an oxidizer gas for supporting the combustion of the fuel gas, and an inert gas. The fuel gas may be about 2 to about 16 molar percent of the combustible mixture 18 of gases. The oxidizer gas may be about 7 to about 98 molar percent of the combustible mixture 18 of gases. The balance is inert gas which may be about 0 to about 91 molar percent of the combustible mixture 18 of gases. Preferably, the combustible mixture 18 of gases includes about 10 to about 14 molar percent of fuel gas, about 15 to about 25 molar percent of oxidizer gas, and about 61 to about 75 molar percent of inert gas.

The fuel gas in the combustible mixture 18 of gases is a mixture of hydrogen gas and a hydrocarbon gas. The hydrocarbon gas is preferably methane. The hydrocarbon gas may alternatively be ethane or propane or an alcohol or an ether.

The fuel gas is preferably a mixture of about 84 to about 96 molar percent of hydrogen gas and about 4 to about 16 molar percent of hydrocarbon gas. Most preferably, the fuel gas comprises about 92 molar percent of hydrogen gas and about 8 molar percent of methane gas.

The oxidizer gas in the combustible mixture 18 of gases is preferably oxygen. The inert gas in the combustible mixture 18 of gases is preferably nitrogen, argon, or a mixture of nitrogen and argon.

In one specific preferred embodiment, the combustible mixture 18 of gases includes about 9.6 to about 11.76 molar percent of hydrogen gas, about 0.4 to about 2.24 molar percent of methane gas, about 15 to about 25 molar percent of oxidizer gas, and about 61 to about 75 molar percent inert gas.

In another specific preferred embodiment, the combustible mixture 18 of gases includes dry air which provides the inert gas (nitrogen) and the oxidizer gas (oxygen). The remainder of the combustible mixture 18 of gases is the fuel gas, which comprises hydrogen gas and methane gas.

Advantageous and unexpected results have been realized by using a fuel gas comprising a mixture of about 84 to about 96 molar percent hydrogen gas and about 4 to about 16 molar percent of a hydrocarbon gas in the combustible mixture 18 of gases. By using a fuel gas with this mixture, the combustible mixture 18 of gases produces a significantly higher output pressure in the air bag 12 without significantly raising the peak pressure in the container 14.

The following Examples illustrate advantageous and unexpected results realized with the present invention.

EXAMPLES 1–5

Combustible mixtures of gases having varying compositions and stored at different pressures were ignited in a 0.65 liter inflator. The resulting gas, or inflation fluid, was then directed into a 60 liter tank. The peak inflator pressure and the output pressure for each combustible mixture of gases were determined. The peak inflator pressure is the highest pressure measured in the 0.65 liter inflator during combustion of the combustible mixture of gases. The output pressure is the pressure measured in the 60 liter tank.

Listed below in Table I are the composition of each stored combustible mixture of gases, the storage pressure of the combustible mixture of gases in the inflator, the average peak inflator pressure ($P_I$), and the average output pressure ($P_T$) for Examples 1–5. Also, listed below in Table I is the calculated figure of merit for each of Examples 1–5. The figure of merit is the product of the average output pressure in a 60 liter tank ($P_T$) times 10,000, divided by the product of the average peak inflator pressure ($P_I$) times the volume of the inflator (V); or, figure of merit=$(P_T)(10,000)/(P_I)(V)$. The calculation of the figure of merit is helpful in comparing inflators having different sizes and shapes. The higher the figure of merit, the higher the output pressure is compared to the peak inflator pressure.

TABLE I

| EXAMPLE | Composition of stored nitrogen gases in molar percents | Pressure at which gas is stored in inflator (psig) | ($P_I$) Avg. peak inflator pressure (psig) | ($P_T$) Avg. output pressure in a 60 liter tank (psig) | Fig. of Merit = $\frac{(P_T)(10,000)}{(P_I)(V)}$ |
|---|---|---|---|---|---|
| 1 | 12.5% $H_2$ 87.5% Air | 2500 | 5812 | 69 | 183 |
| 2 | 13% $H_2$ 87% Air | 2800 | 6700 | 88 | 202 |
| 3 | 12% $H_2$ 1% $CH_4$ 87% Air | 2500 | 7055 | 113 | 246 |
| 4 | 12% $H_2$ 1% $CH_4$ 87% Air | 2000 | 7035 | 96 | 210 |
| 5 | 10% $H_2$ 2% $CH_4$ 88% Air | 2000 | 6400 | 86 | 207 |

EXAMPLES 6–7

Combustible mixtures of gases having varying compositions were stored and ignited at 4000 psig in a 0.36 liter inflator. The resulting gas, or inflation fluid, was directed into a 60 liter tank. The peak inflator pressure and the output pressure for each combustible mixture of gases were determined. Listed below in Table II are the composition of the combustible mixture of gases, the storage pressure of the mixture of gases in the inflator, the average peak inflator pressure, and the average output pressure for Examples 6–7. Also listed in Table II is the calculated figure of merit for each of Examples 6–7.

TABLE II

| EXAMPLE | Composition of stored mixture of combusible gases in molar percents | Pressure at which gas is stored at in inflator (psig) | ($P_I$) Avg. peak inflator pressure (psig) | ($P_T$) Avg. output pressure in a 60 liter tank (psig) | Fig. of Merit = $\frac{(P_T)(10,000)}{(P_I)(V)}$ |
|---|---|---|---|---|---|
| 6 | 12.8% $H_2$ 87.2% Air | 4000 | 8200 | 53 | 179 |
| 7 | 11.96% $H_2$ 1.04% $CH_4$ 87% Air | 4000 | 8500 | 66 | 216 |

As can be seen from Tables I and II, a combustible mixture 18 of gases in accordance with the present invention produces a relatively large increase in output pressure with only a relatively small increase in peak inflator pressure, compared to a prior art combustible mixture of gases which uses a pure hydrogen fuel gas.

For instance, the average output pressure of Example 3 is 63.7% higher than the average output pressure of prior art Example 1. This increased output pressure of Example 3 is achieved while producing an average peak inflator pressure which is only 21.4% higher than the average peak inflator pressure of prior art Example 1. As another example, the average output pressure of Example 7 is 24.5% higher than the average output pressure of prior art Example 6, while the average peak inflator pressure of Example 7 is only 3.7% higher than the average peak inflator pressure of prior art Example 6.

Moreover, relatively greater output pressures can be achieved with equal or even lower storage pressures. For example, even though the combustible mixture of gases in prior art Example 2 is stored at a pressure significantly higher than the combustible mixtures of gases of Examples 3 and 4, the average output pressures of Example 3 and 4 are 28.4% and 9.1% higher, respectively, than the average output pressure of prior art Example 2. In addition, the average peak inflator pressures of Examples 3 and 4 are only 5.3% and 5% higher, respectively, than the average peak inflator pressure of prior art Example 2.

As another example, even though the combustible mixture of gases in prior art Example 1 is stored at a pressure significantly higher than the combustible mixtures of gases in Examples 4 and 5, the average output pressures of Examples 4 and 5 are 39.1% and 24.6% higher, respectively, than the average output pressure of prior art Example 1. The average peak inflator pressures of Examples 4 and 5 are only 21.0% and 10.1% higher, respectively, than the average peak inflator pressure of prior art Example 1.

As a further example, the combustible mixture of gases in prior art Example 2 is stored at a pressure significantly higher than the combustible mixture of gases stored in Example 5. The average output pressures of Examples 2 and 5 are roughly the same while the average peak inflator pressure of Example 5 is about 5% lower than the average peak inflator pressure of prior art Example 2.

From the above examples, it can be appreciated that the combustible mixture 18 of gases of the present invention can be stored at a pressure less than or equal to that of the prior art combustible mixture of gases, and still produce output pressures equal to or higher than those of the prior art combustible mixture of gases. Also, the combustible mixture 18 of gases of the present invention produces a higher output pressure for a particular peak inflator pressure than the prior art combustible mixture of gases. These features provide a number of advantages. A decrease in the storage pressure of the combustible mixture of gases could be considered more desirable by vehicle manufacturers and/or vehicle users. Also, a decrease in storage pressure and a decrease in peak inflator pressure could result in a weight and cost reduction in the inflator, since the inflator housing may be made of a lighter and/or less costly material. Further, a lesser quantity of the combustible mixture 18 of gases of the present invention may be used to produce the same output as a prior art combustible mixture of gases.

It is believed that the combustion of a quantity of a fuel gas mixture of hydrogen gas and methane gas releases more heat than the combustion of the same quantity of pure hydrogen gas, while burning at a speed equal to or less than that of pure hydrogen gas. It is therefore believed that with the fuel gas mixture of the present invention, more heat is produced over a longer period of time, thereby creating a higher output pressure than results from a pure hydrogen fuel gas.

From the above description of the invention, those skilled in the art will perceive applications, improvements, changes and modifications to the present invention. For instance, the combustible mixture 18 of gases may be used in an inflator having two separately controllable gas storage chambers each having its own igniter. The two igniters could be actuated simultaneously or at different times to provide an output pressure in the air bag which is tailored as a function of time. Such applications, improvements, changes and modifications within the skill of the art are intended to be covered by the appended claims.

Having described the invention, we claim:

1. Apparatus for use in inflating an inflatable vehicle occupant protection device, said apparatus comprising:

a pressure vessel for containing a combustible mixture of gases;

a combustible mixture of gases contained within said pressure vessel, said combustible mixture of gases comprising a fuel gas mixture, an oxidizer gas for supporting combustion of said fuel gas mixture, and an inert gas, said fuel gas mixture comprising about 84 to about 96 molar percent hydrogen gas and about 4 to about 16 molar percent hydrocarbon gas based on the moles of fuel gas mixture;

an actuatable igniter for igniting said combustible mixture of gases in said pressure vessel; and means for enabling gas to flow from said pressure vessel into the vehicle occupant protection device.

2. The apparatus as defined in claim 1 wherein said combustible mixture of gases comprises about 2 to about 16 molar percent fuel gas mixture.

3. The apparatus as defined in claim 2 wherein said combustible mixture of gases comprises about 10 to about 14 molar percent fuel gas mixture.

4. The apparatus as defined in claim 3 wherein said hydrocarbon gas is selected from the group consisting of methane, ethane, propane, an alcohol, and an ether.

5. The apparatus as defined in claim 4 wherein said hydrocarbon gas is methane.

6. The apparatus as defined in claim 2 wherein said combustible mixture of gases comprises about 7 to about 98 molar percent oxidizer gas.

7. The apparatus as defined in claim 6 wherein said combustible mixture of gases comprises about 15 to about 25 molar percent said oxidizer gas and about 10 to about 14 molar percent of said fuel gas mixture, and said hydrocarbon gas is methane.

8. The apparatus as defined in claim 7 wherein said oxidizer gas comprises oxygen.

9. The apparatus as defined in claim 8 wherein said combustible mixture of gases comprises up to about 85 molar percent of inert gas.

10. The apparatus as defined in claim 9 wherein said combustible mixture of gases comprises about 61 to about 75 molar percent inert gas.

11. The apparatus as defined in claim 10 wherein said inert gas comprises nitrogen.

12. The apparatus as defined in claim 3 wherein said pressure vessel defines at least one storage chamber for storing said combustible mixture of gases.

13. A combustible mixture of gases comprising a fuel gas mixture, an oxidizer gas for supporting combustion of said fuel gas mixture, and an inert gas, said fuel gas mixture comprising about 84 to about 96 molar percent hydrogen gas and about 4 to about 16 molar percent hydrocarbon gas based on the moles of fuel gas mixture.

14. The combustible mixture of gases as defined in claim 13 wherein said combustible mixture of gases comprises about 2 to about 16 molar percent fuel gas mixture.

15. The combustible mixture of gases as defined in claim 14 wherein said combustible mixture of gases comprises about 10 to about 14 molar percent fuel gas mixture.

16. The combustible mixture of gases as defined in claim 15 wherein said hydrocarbon gas is selected from the group consisting of methane, ethane, propane, an alcohol, and an ether.

17. The combustible mixture of gases as defined in claim 16 wherein said hydrocarbon gas is methane.

18. The combustible mixture of gases as defined in claim 17 wherein said combustible mixture of gases comprises about 15 to about 25 molar percent oxidizer gas.

19. The combustible mixture of gases as defined in claim 18 wherein said combustible mixture of gases comprises about 61 to about 75 molar percent inert gas.

* * * * *